United States Patent [19]

Krause

[11] 4,100,423

[45] Jul. 11, 1978

[54] OPTO-ELECTRONIC TWO-WAY COUPLING

[75] Inventor: Gerhard Krause, Rosenheim, Egarten, Fed. Rep. of Germany

[73] Assignee: Siemens Aktiengesellschaft, Berlin & Munich, Fed. Rep. of Germany

[21] Appl. No.: 774,661

[22] Filed: Mar. 4, 1977

[30] Foreign Application Priority Data

Apr. 2, 1976 [DE] Fed. Rep. of Germany ....... 2614359

[51] Int. Cl.² ............................................. G02B 27/00
[52] U.S. Cl. ................................ 250/551; 250/214 A; 330/59; 330/308
[58] Field of Search ................... 250/214 A, 221, 551; 307/311; 330/59, 308

[56] References Cited

U.S. PATENT DOCUMENTS 3,912,951  10/1975  Kihara ........................... 307/311 X

FOREIGN PATENT DOCUMENTS 427,472  12/1974  U.S.S.R. ............................. 307/311

*Primary Examiner*—James B. Mullins
*Attorney, Agent, or Firm*—Hill, Gross, Simpson, Van Santen, Steadman, Chiara & Simpson

[57] ABSTRACT

An opto-electronic coupler for signal voltages of < 1 V is provided in which the transmitter of the coupler is electrically separated from the receiver. In order to avoid a current supply device, there are provided two additional couplers connected in series and of opposite coupling direction to the first coupler. The additional couplers supply the necessary energy for a luminescent diode transmitter of the first coupler.

10 Claims, 2 Drawing Figures

OPTO-ELECTRONIC TWO-WAY COUPLING

BACKGROUND OF THE INVENTION

The invention relates to an opto-electronic two-way coupling having a signal input which is electrically separated from the signal output which has a first opto-electronic coupler connected via its transmitter to the signal input and via its receiver to the signal output, and which is designed for signal voltages of less than 1 V.

In numerous applications for opto-electronic couplers, such couplers cannot be used without special techniques, since the signal voltage level is too low to directly trigger the infrared luminescence diode (IRED) of the opto-electronic coupler. A current supply device cannot be utilized since otherwise the side of the signal input to be electrically separated would then be impermissibly connected to the mains voltage.

Examples for use of opto-electronic two-way couplings in which the signal input is electrically separated from the signal output are:

(a) Devices in medical electronics designed for protection of the patient;
(b) Message transmission technology;
(c) Probes for oscilloscopes and other measurement devices with complete isolation of the preamplifier from ground; and
(d) Electrical meters and regulatory circuits in high-voltage or mains circuits.

SUMMARY OF THE INVENTION

It is therefore an object of the invention to provide an opto-electronic two-way coupling in which small signal voltages under 1 V may be transmitted while maintaining electrical separation of signal input and signal output.

This objective is accomplished by use of at least one further opto-electronic coupler in parallel to the first coupler and with a coupling direction opposite thereto.

In the invention, the signal input is completely electrically separated from the signal output. No current supply device is required. Nevertheless, signal voltages far below 1V are transmittable if several opto-electronic couplers are provided in parallel to the first coupler.

DESCRIPTION OF THE PREFERRED EMBODIMENTS

Figure 1:
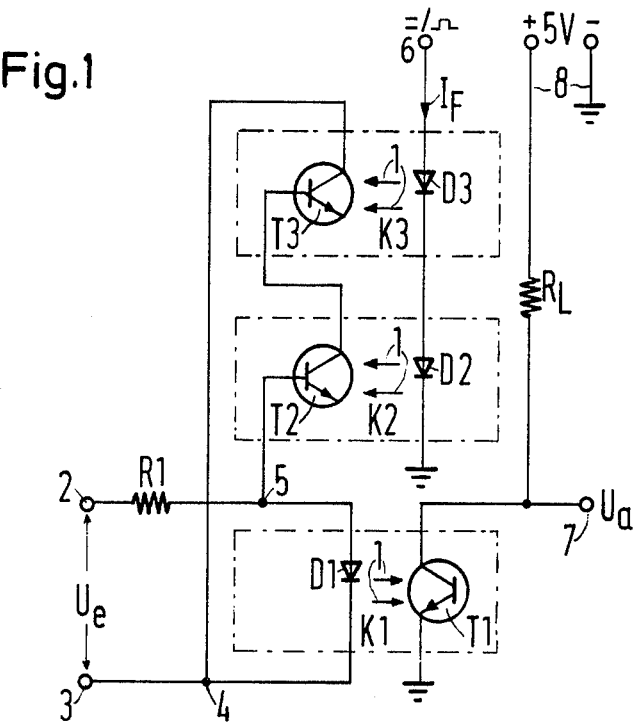
FIG. 1 is a circuit diagram of a first embodiment of the invention.

In the two figures, parts corresponding to one another are provided with identical reference numerals.

Figure 2:
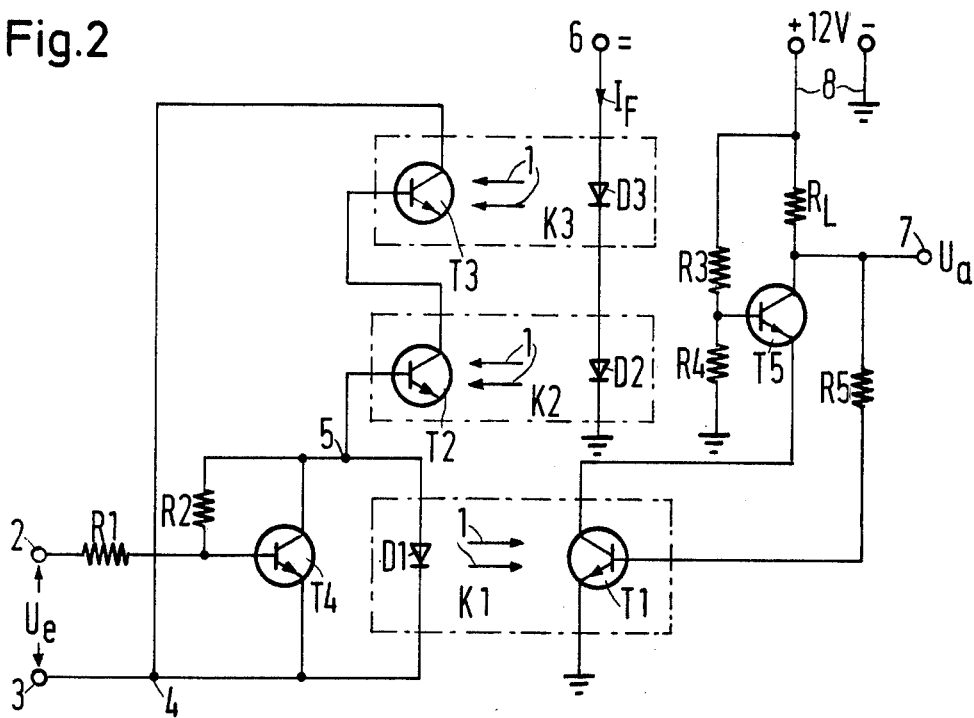
FIG. 2 is a circuit diagram of another embodiment of the invention.

In FIGS. 1 and 2, three opto-electronic couplers $K_1$ to $K_3$ are arranged parallel to one another with couplers $K_2$ and $K_3$ having a coupling direction opposite to coupler $K_1$. Coupler $K_1$ consists of a diode $D_1$ as a transmitter, and a transistor $T_1$ as a receiver. Coupler $K_2$ consists of a diode $D_2$ as a transmitter, and a transistor $T_2$ or a diode as a receiver. Coupler $K_3$ consists of a diode $D_3$ as a transmitter, and a transistor $T_3$ as a receiver. The direction of the transmitted light is indicated by arrows 1 in each case. Diodes $D_1$ to $D_3$ are infrared luminescence diodes.

Diode $D_1$ is connected, via a resistance $R_1$ with 47 kOhms, to input terminals 2, 3 to which an input voltage $U_e$ is applied, which is $<1.0$ V.

Transistors $T_2$ and $T_3$ are located with their collector-base sections in series between connecting points 4 and 5 on lines which are connected to the terminals 2, 3.

Diodes $D_2$ and $D_3$ are connected to a terminal 6 to which a direct current $I_F$ of 50 mA is connected. In the embodiment in FIG. 1, a current with a pulse-shaped pattern can also be used instead of the direct current $I_F$.

The direct current $I_F = 50$ mA flows through the diodes $D_2$ and $D_3$ into the couplers $K_2$ and $K_3$. The radiation generated by the diodes $D_2$ and $D_3$ strikes the transistors $T_2$ and $T_3$. The collector-base sections of these transistors $T_2$ and $T_3$ operate as a photo-electric cell. Each of these photo-electric cells generates a voltage of 0.5 to 0.6 V. Since transistors $T_2$ and $T_3$ are connected in series, they emit a voltage which is sufficient to drive the diode $D_1$. The current through diode $D_1$ amounts to approximately 100 µA. Superimposed on this direct current is the signal current which is emitted from a signal voltage source at terminals 2, 3 via the resistance $R_1$.

The coupler $K_1$ operates as a normal opto-electronic coupler so that an output signal $U_a$ is available at terminal 7. Terminal 7 is connected, via a load resistance $R_L$, to a DC source 8 which emits a voltage of 5 V in the embodiment in FIG. 1, and 12 V in the embodiment in FIG. 2.

The available current for diode $D_1$ is relatively small. Therefore, only couplers with a large coupling factor are suitable between diode $D_1$ and the collector-base diode of transistor $T_1$. With the available current, the coupling factor of coupler $K_1$ is about 10%. It should be noted that the typical commercial couplers are measured with a substantially higher operating point. In this case the operating point should be suitably adjusted.

It is advantageous if, instead of a direct current, a pulse-shaped current with a peak value of, for example, 1A flows through the diodes $D_2$ and $D_3$. The pulse-duty factor then amounts to 0.1 so that the power loss is held within allowable limits. For the diode $D_1$, a pulse-shaped current of $\geq 1$ mA is then available and the coupling factor for the coupler $K_1$ is about 100%. With this type of operation using a pulse-shaped current supply, the cut-off frequency of the signal to be transmitted is higher (for example, 3.3 kHz in FIG. 1 and 100 kHz in FIG. 2), and special selection of the couplers is not necessary. Amplitude-modulated pulses are available at output $U_a$ in this case. The pulse frequency must, however, be higher than double the cut-off frequency of the system.

In the sample embodiment of FIG. 1, the cut-off frequency is relatively small (3.3 kHz) because of the small collector current of transistor $T_1$. The cut-off frequency may, however, be increased to 4.6 kHz by means of a direct current fed into the base of the transistor $T_1$. A cascode circuit of a transistor $T_5$, resistors $R_3$, $R_4$, $R_5$, as well as resistance $R_L$ is especially advantageous. Resistor $R_3$ has a resistance value of 1KΩ. Resistor $R_4$ has a resistance value of 1KΩ. Resistor $R_5$ has a resistance of 20 megohms. Resistor $R_L$ has a resistance value of 10KΩ. Resistor $R_5$ simultaneously effectuates inverse feedback for the base current. The cut-off frequency in this case amounts to 55 kHz.

If the input signal $U_e$ to be transmitted is very small, an amplification can be performed before feeding the diode $D_1$. A current supply for an amplifier suitable for this purpose can be taken across to diode $D_1$. In the sample embodiment in FIG. 2, an amplifier stage consisting of a transistor $T_4$ and a resistor $R_2$ with a resistance value of 3 megohms is provided for this purpose. Multistage amplifiers with inverse, degenerative feedback can also be used, of course, as well as logic circuits.

Instead of the current supplied by the transistors $T_2$ and $T_3$ being fed in parallel to the signal voltage source ($U_e$ at terminals 2, 3), transistors $T_2$, $T_3$, diode $D_1$, and the signal voltage source can also be connected in series for low-resistance signal voltage sources.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An opto-electronic two-way coupling system having a signal input for signal voltages below 1 volt which is electrically separated from the signal output, said system including a first opto-electronic coupler having a transmitter and receiver and connected via its transmitter to the signal input and via its receiver to the signal output, and at least one additional opto-electronic coupler having a transmitter and receiver with a coupling direction opposite to the first coupler, its receiver connected to the signal input and its transmitter connected to a current source separate from the signal output.

2. A two-way coupling system according to claim 1, in which in addition to the first opto-electronic coupler two additional couplers are provided with coupling directions opposite to the first coupler.

3. A two-way coupling system according to claim 1, characterized by an amplifier stage between the signal input and the first coupler.

4. A two-way coupling system according to claim 1, characterized by a cascode circuit between the first coupler and the signal output.

5. A two-way coupling system according to claim 1, characterized in that the transmitter of the additional coupler is supplied with pulses.

6. A two-way coupling system according to claim 5, in which the pulses are not modulated.

7. A two-way coupling system according to claim 1, in which the transmitter of the additional coupler is supplied with direct current.

8. The system of claim 1 in which the additional opto-electronic coupler connected with the transmitter of the first coupler comprises a current supply device, an external current supply not being provided.

9. An opto-electronic coupling system for use with low level signal voltages, comprising:
    (a) first and second opto-electronic couplers each having a transmitter and a receiver;
    (b) a signal voltage input connected to the first coupler transmitter and a signal voltage output connected to its receiver;
    (c) the receiver of the second coupler being connected to the transmitter of the first coupler; and
    (d) the transmitter of the second coupler being connected to a current source separate from the signal voltage output.

10. The system of claim 9 in which an amplifying stage is connected between the signal voltage input and the first coupler transmitter and said second coupler receiver is connected to the amplifying stage to provide power therefore.

* * * * *